(12) United States Patent
Matsuki

(10) Patent No.: US 9,454,230 B2
(45) Date of Patent: Sep. 27, 2016

(54) IMAGING APPARATUS FOR TAKING IMAGE IN RESPONSE TO SCREEN PRESSING OPERATION, IMAGING METHOD, AND PROGRAM

(71) Applicant: KDDI Corporation, Tokyo (JP)

(72) Inventor: Tomoaki Matsuki, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 288 days.

(21) Appl. No.: 14/347,003

(22) PCT Filed: Sep. 21, 2012

(86) PCT No.: PCT/JP2012/074213
§ 371 (c)(1),
(2) Date: Jul. 3, 2014

(87) PCT Pub. No.: WO2013/047364
PCT Pub. Date: Apr. 4, 2013

(65) Prior Publication Data
US 2014/0359438 A1  Dec. 4, 2014

(30) Foreign Application Priority Data

Sep. 26, 2011 (JP) .................. 2011-208506

(51) Int. Cl.
*G06F 15/00* (2006.01)
*G06F 13/00* (2006.01)
(Continued)

(52) U.S. Cl.
CPC .................. *G06F 3/016* (2013.01); *G02B 7/36* (2013.01); *G06F 3/04817* (2013.01);
(Continued)

(58) Field of Classification Search
CPC ........................... G06F 3/0485; G06F 3/0482

USPC ....... 715/784, 798, 771, 800, 702, 761–764, 715/864
See application file for complete search history.

(56) References Cited

U.S. PATENT DOCUMENTS 6,919,927 B1 * 7/2005 Hyodo ............... H04N 1/00411
348/333.02
8,094,228 B2 * 1/2012 Misawa ............. H04N 5/23293
348/333.01
(Continued)

FOREIGN PATENT DOCUMENTS

JP         A-11-355617      12/1999
JP         2004-064205 A     2/2004
(Continued)

OTHER PUBLICATIONS

Office Action issued in Japanese Patent Application No. 2011-208506 dated Jul. 2, 2014 (with partial translation).
(Continued)

*Primary Examiner* — Kevin Nguyen
(74) *Attorney, Agent, or Firm* — Oliff PLC

(57) ABSTRACT

A method of operating an image-capturing device for displaying an image of a subject on a screen, and performing image-capturing operation for the subject in response to a user's input to the screen. The method includes: a first step of detecting a pressing force of the user's finger press on the screen; a second step of displaying an image capture icon on the screen, the icon being actuated by the user for commanding the device for the capturing operation; a third step of, in response to a determination that the touch position overlaps with a region of the icon displayed, and that the force is above a first threshold, initiating focusing operation to focus on the subject; and a fourth step of, after the focusing operation is initiated, in response to a determination that the force is above a second threshold larger than the first threshold, initiating the capturing operation.

9 Claims, 6 Drawing Sheets

(51) Int. Cl.
| | |
|---|---|
| *G06F 3/01* | (2006.01) |
| *G02B 7/36* | (2006.01) |
| *H04N 5/232* | (2006.01) |
| *G06F 3/0488* | (2013.01) |
| *G06F 3/0481* | (2013.01) |
| *G06F 3/0484* | (2013.01) |
| *G02B 13/00* | (2006.01) |

(52) U.S. Cl.
CPC ...... *G06F 3/04842* (2013.01); *G06F 3/04883* (2013.01); *G06F 3/04886* (2013.01); *H04N 5/23212* (2013.01); *H04N 5/23216* (2013.01); *H04N 5/23222* (2013.01); *H04N 5/23245* (2013.01); *H04N 5/23296* (2013.01); *G02B 13/009* (2013.01); *G06F 2203/04105* (2013.01); *G06F 2203/04806* (2013.01); *H04N 5/23293* (2013.01)

(56) References Cited

U.S. PATENT DOCUMENTS

| | | | | |
|---|---|---|---|---|
| 8,979,289 | B2 * | 3/2015 | Camli | F24C 7/082 362/23.09 |
| 2008/0303935 | A1 | 12/2008 | Misawa | |
| 2011/0001801 | A1 | 1/2011 | Misawa | |
| 2011/0102355 | A1 | 5/2011 | Aono et al. | |
| 2011/0148795 | A1 | 6/2011 | Aono et al. | |

FOREIGN PATENT DOCUMENTS

| | | |
|---|---|---|
| JP | A-2004-48526 | 2/2004 |
| JP | 2004-070492 A | 3/2004 |
| JP | A-2008-003702 | 1/2008 |
| JP | A-2008-85737 | 4/2008 |
| JP | A-2008-306381 | 12/2008 |
| JP | A-2010-20405 | 1/2010 |
| JP | 2010-146513 A | 7/2010 |
| JP | 2010-152716 A | 7/2010 |
| JP | A-2010-146507 | 7/2010 |
| WO | WO 2011/099361 A1 | 8/2011 |

OTHER PUBLICATIONS

Sep. 2, 2015 Office Action issued in Japanese Patent Application No. 2015-112103.

Dec. 28, 2015 Office Action issued in Japanese Patent Application No. 2015-112103.

Office Action issued in Japanese Application No. 2011-208506 issued Nov. 6, 2013 (with translation).

International Search Report issued in International Application No. PCT/JP2012/074213 mailed Dec. 11, 2012.

International Preliminary Report on Patentability issued in International Application No. PCT/JP2012/074213 issued Apr. 1, 2014.

* cited by examiner

IMAGING APPARATUS FOR TAKING IMAGE IN RESPONSE TO SCREEN PRESSING OPERATION, IMAGING METHOD, AND PROGRAM

TECHNICAL FIELD

The invention relates to techniques of displaying an image of a subject on a touch screen, and capturing the image of the subject in response to a user's motion on the touch screen.

This application claims under the Paris Convention the benefit of the priority of Japanese Patent Application No. 2011-208506 filed on 26 Sep. 2011, which is hereby incorporated by reference herein in its entirety for the purposes of PCT Rule 20.6.

BACKGROUND ART

Currently, as image capturing devices for capturing images of subjects, digital cameras, mobile information devices capable of capturing images, etc. are wide-spread. Many of those devices include a display function for displaying images of subjects on a display screen, and a touch panel that allows a user to provide input via finger touches on the display screen in association with the images displayed on the display screen. The user can provide desired input to the device by touching the touch panel with a finger, a stylus, etc.

For example, Patent Document No. 1 discloses a digital camera device having an automatic focus or auto-focus function and an automatic exposure or auto-exposure function. This digital camera device operates such that, if the user touches a finger to a display screen in the form of a liquid crystal display combined with a touch panel, in a region of a particular icon being displayed on the display screen, then an auto-focus mode is selected. In addition, this digital camera device further operates such that, when an image of a subject to focus on during the auto-focus mode is being displayed on the display screen, if the user touches a finger to the display screen at a selected one of points within the displayed image of the subject, then a region centered at the finger touching point is selected and is assigned a square-shaped focus area where auto-focus is implemented.

Additionally, this digital camera device further operates such that, when an image of a subject the exposure of which is to be adjusted during the auto-exposure mode is being displayed on the display screen, if the user touches a finger to the display screen at a selected one of points within the displayed image of the subject, then a square-shaped exposure metering area is located such that the exposure metering area is centered at the finger touching point. In this digital camera device, exposure adjustment is implemented based on image signals from the exposure metering area.

In addition, in an electronic camera disclosed in Patent Document No. 2, an image representative of a plurality of persons' faces are displayed on a display screen of an LCD monitor, and picture frames for respectively indicating the plurality of persons' faces being displayed are laid over the image. If the user touches a finger to the display screen of the LCD monitor in a selected one of the picture frames being displayed, then one of the face images which is surrounded by the selected picture frame is selected as a primary subject for the image capture process. This makes it easier for the user to correctly select one of the face images within the image as an auto-focus target.

PRIOR-ART REFERENCES

Patent Documents

Patent Document No. 1: Japanese Patent Application Publication No. 2004-048526
Patent Document No. 2: Japanese Patent Application Publication No. 2008-085737

SUMMARY OF THE INVENTION

Problem(s) that the Invention Attempts to Solve

An apparatus designed to incorporate a touch panel for allowing the user to provide input to an image capturing device, however, is more prone to incorrect manipulation of the apparatus, such as unintended activation of the apparatus and unintended operation of the apparatus, than an apparatus designed to incorporate physical buttons or keys instead of the touch panel.

More specifically, for an apparatus that allows the user to provide input to an image capturing device via manipulation of a touch panel is used, if the user mistakenly touches the touch panel, then the apparatus interprets the user's input as if the user issued an image-capture-associated request to the apparatus, causing the apparatus to invoke image-capturing operation, or even if the user's input is correct, the apparatus fails to correctly interpret the input, resulting in the apparatus failing to accomplish a user-desirable function or operation, which can require the user to repeat the input motion.

Given the above circumstances, the apparatuses disclosed in Patent Document Nos. 1 and 2 are configured such that the user's finger touch to a touch panel does not invoke image-capturing operation, that is, release of a shutter. From the users' perspective, image capture is one of events that should not be invoked due to the apparatuses' incorrect operation, in particular, and so those apparatuses are typically configured to initiate image capture in response to the user's actuation of a physical shutter button (a shutter key). For example, the apparatus disclosed in Patent Document No. 2 is configured to capture an image in response to the user's input via a physical control. As a result, this apparatus is configured to use both a physical button (key) actuated for commanding the image-capturing operation, and a touch panel manipulated for selecting a focus target, in order to minimize incorrect operation during the image capture process.

For an apparatus designed to use a physical button for avoiding incorrect operation, a focus request is issued to the apparatus via the user's finger motion on a touch panel, and an image capture request is issued to the apparatus via the user's actuation of the physical button with a finger. It is ideally desirable that the user commands this apparatus to invoke focusing operation and image-capturing operation via the user's series of motions that are mutually categorically the same, but actually this apparatus has to require the user to perform a plurality of discontinued motions that are mutually categorically different, resulting in the limits in improving the maneuverability of this apparatus.

Then, the object of the invention is to provide an image capturing device, an image-capturing method and a program all of which are able to capture an image of a subject in response to the user's input to a display screen on which the image of the subject is displayed, while avoiding unintended operation.

Means or Steps for Solving the Problem(s)

The following modes are provided by the invention. These modes will be stated below such that these modes are divided into sections and are numbered, such that these modes depend upon other mode(s), where appropriate, and such that each mode in such a dependent form permits each technical feature set forth in each mode to be independent or separate according to the nature of the corresponding technical feature, where appropriate.

(1) An image capturing device for displaying an image of a subject on a display screen, and performing image-capturing operation for capturing the image of the subject in response to a user's input to the display screen, the image capturing device comprising:
a pressing-force sensor for detecting a pressing force with which the user presses the display screen with a finger;
a display controller configured to display an image capture icon on the display screen, the image capture icon being actuated by the user for commanding the image capturing device to perform the image-capturing operation;
a touch-position recognizing unit configured to determine whether or not the user's finger touch position at which the user touches the display screen with the finger has an overlap with a region of the image capture icon displayed;
a pressing-force recognizing unit configured to be activated in response to a determination that the finger touch position has an overlap with the region of the image capture icon displayed, to determine whether or not the pressing force is equal to or larger than a first threshold; and
an operation controller configured to be activated in response to a determination that the detected pressing force is equal to or larger than the first threshold, to initiate focusing operation to focus on the subject,
wherein the pressing-force recognizing unit determines, after the focusing operation is initiated, whether or not the pressing force is equal to or larger than a second threshold larger than the first threshold, and
the operation controller initiates the image-capturing operation in response to a determination that the pressing force is equal to or larger than the second threshold.

(2) The image capturing device according to mode (1), wherein the operation controller initiates the focusing operation, in response to the user's half press of the image capture icon with the finger by applying a pressing force equal to or larger than the first threshold and below the second threshold, and initiates the image-capturing operation, in response to the user's subsequent press of the image capture icon with the finger by applying a pressing force equal to or larger than the second threshold.

(3) The image capturing device according to mode (1) or (2), wherein the display controller displays the image capture icon on the display screen such that at least one of a position and a size of the image capture icon displayed is adjustable.

(4) The image capturing device according to any one of modes (1)-(3), further comprising:
a haptic feedback arrangement configured to impart haptic feedback to the finger in contact with the display screen; and
a haptic feedback controller configured to activate the haptic feedback arrangement in response to the operation controller initiating the image-capturing operation.

(5) The image capturing device according to mode (4), wherein the haptic feedback controller is activated in response to the user's manipulation of a virtual control displayed on the display screen with the finger, to control the haptic feedback arrangement to impart vibrations to the finger in a manner that causes the user to misperceive the finger manipulation of the virtual control as if the user manipulated a physical control with the finger.

(6) The image capturing device according to any one of modes (1)-(5), further comprising a zoom-speed determining unit configured to determine a zoom speed at which a displayed image of the subject on the display screen is zoomed, prior to the image-capturing operation,
wherein the display controller displays a zoom icon on the display screen, the zoom icon being actuated by the user for commanding the image capturing device to initiate zooming operation,
the touch-position recognizing unit determines whether or not the finger touch position has an overlap with a region of the zoom icon displayed,
the zoom-speed determining unit determines the zoom speed as a function of a magnitude of the pressing force, in response to a determination that the finger touch position has an overlap with the region of the zoom icon displayed, and
the operation controller instructs displaying an image of the subject on the display screen such that the image is zoomed at the determined zoom speed, prior to the image-capturing operation.

(7) The image capturing device according to any one of modes (1)-(6), wherein the display controller displays a mode selection icon on the display screen, the mode selection icon being actuated by the user to select one from a plurality of modes including a mode for performing the image-capturing operation, and a mode for performing playing-back operation in which an image previously captured by the image capturing device is played back,
the touch-position recognizing unit determines whether or not the finger touch position has an overlap with a region of the mode selection icon displayed,
the pressing-force recognizing unit is activated in response to a determination that the finger touch position has an overlap with the region of the mode selection icon displayed, to determine whether or not the pressing force is equal to or larger than a third threshold, and
the operation controller is activated in response to a determination that the pressing force is equal to or larger than the third threshold, to select one from the plurality of modes, depending on which one of a plurality of positions within the region of the mode selection icon displayed has an overlap with the finger touch position, and perform the selected mode.

(8) A method of operating an image capturing device for displaying an image of a subject on a display screen, and performing image-capturing operation for capturing the image of the subject in response to a user's input to the display screen, the method comprising:
a first step of detecting a pressing force with which the user presses the display screen with a finger;
a second step of displaying an image capture icon on the display screen, the image capture icon being actuated by the user for commanding the image capturing device to perform the image-capturing operation;
a third step of, in response to a determination that the user's finger touch position at which the use touches the display screen with the finger has an overlap with a region of the image capture icon displayed, and that the pressing force is equal to or larger than a first threshold, initiating focusing operation to focus on the subject; and a fourth step of, after the focusing operation is initiated, in response to a determination that the pressing force is equal to or larger than a second threshold larger than the first threshold, initiating the image-capturing operation.

(9) A method of operating an image capturing device for displaying an image of a subject on a display screen, and performing image-capturing operation for capturing the image of the subject in response to a user's input to the display screen, the method comprising:

in response to the user's finger touch to the display screen at a predetermined position with an intensity higher than that with the user's pure finger touch to the display screen, recognizing that the user is issuing an image capture command, and performing image-capturing operation for capturing the subject displayed on the display screen.

(10) A program to be executed by a computer to perform the method according to mode (8) or (9).

(11) A computer-readable non-transitory storage medium having stored therein the program according to mode (10).

Advantageous Effects of the Invention

An image capturing device, an image-capturing method and a program according to the present invention make it easy to reduce the possibility that incorrect operation causes unintended image capture, without worsening the user maneuverability.

MODES FOR CARRYING OUT THE INVENTION

Figure 1A:
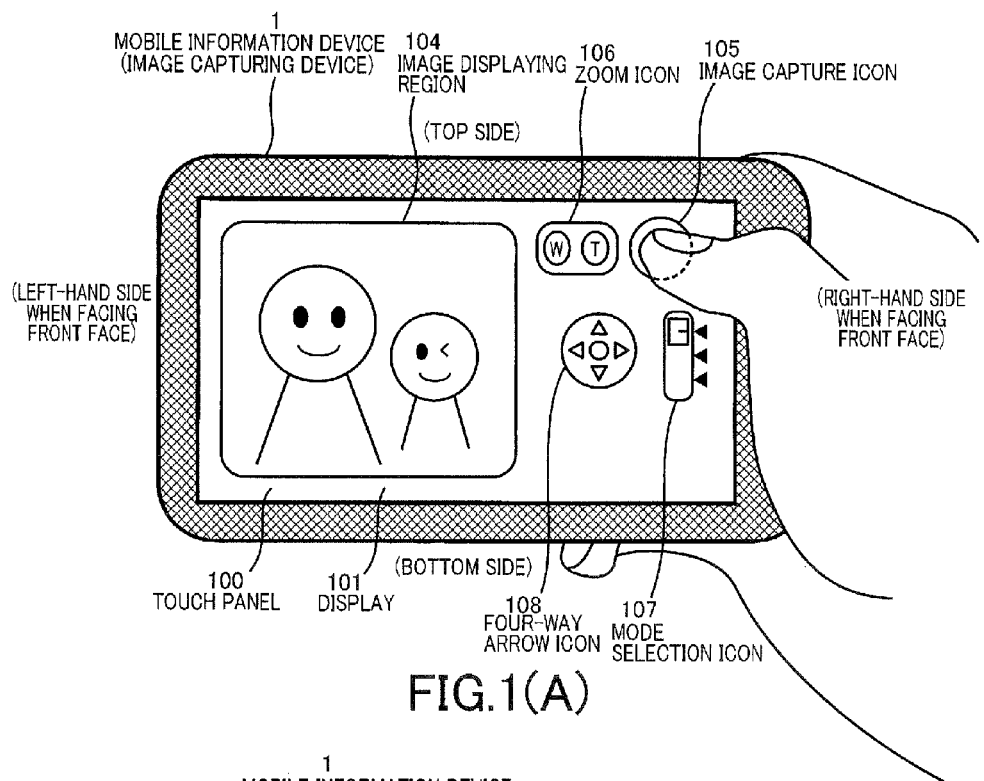
FIGS. 1(A) and 1(B) are a front view and a back view illustrating a mobile information device according to an illustrative embodiment of the invention, respectively.

Illustrative embodiments of the invention will be described in detail below with reference to the drawings.

Image capturing devices according to illustrative embodiments of the invention include a display and a touch panel. Each of those image capturing devices displays an image capture icon on a display screen of the display, and, in response to the user's finger press to the display screen at the image capture icon (i.e., the user's motion via a press to the display screen with a larger force than that with a pure touch), recognizes a command as one for focusing operation or one for image-capturing operation and performs operation associated with the command.

It is noted that the term "image capture" is used throughout this specification to merely mean image capture in a narrow sense in which light representative of an image of a subject is converted to an image signal, and the image signal is stored in a memory or storage, but the term may alternatively be used to also include events which are not included in but associated with the image capture in the narrow sense, for example, focusing and exposure adjustment, and in other words, the term may alternatively be used to mean a set of all events associated with the image capture in the narrow sense.

In each of those image capturing devices, the user's inputs that are required to provide for commanding focusing operation and image-capturing operation are not a pure finger-touch to the image capture icon (a finger press to the display screen with the finger with a force equal to or smaller than a predetermined value), but a finger press to the image capture icon (a finger press to the display screen with the finger with a force larger than the predetermined value), and so the user's unintended touch to the touch panel would not cause the image capturing device to perform incorrect operation and invoke unintended image-capturing operation.

In addition, in each of those image capturing devices, focus operation and image-capturing operation are invoked by the user's series of motions by manipulation of the touch panel (hereinafter, referred to also as "touch screen") in a region of the image capture icon being displayed, with a finger (i.e., a finger touch with a smaller force (i.e., a soft press) and a subsequent finger touch with a larger force (i.e., a hard press), both to the display screen in the same region, thereby achieving a finger press gesture in which the finger is being pressed to the display screen with an increasing force over time, substantially without moving the finger across the display screen), and then are implemented, resulting in the increased user maneuverability.

Additionally, in each of those image capturing devices, a control to be actuated by the user for issuing an image capture command is not a physical button or key, but an icon (i.e., a virtual button or key) in the form of an image displayed on the display screen, and so the icon gives easier adjustment of the position and the size of the control than the physical button or key gives. This image capturing device, therefore, allows the image capture icon to be displayed at a position variable enough for the user to correctly press a finger to the display screen, during an image capture process, whether the user uses this image capturing device in a vertical or horizontal orientation, wherein the finger is one of fingers of the hand with which the user holds this image capturing device. In other words, the user's finger can reach the image capture icon, irrespective of whichever direction this image capturing device in use is oriented in.

It is noted that what the invention can be applied to includes image capturing devices configured such that, in response to the user's finger touch to a touch panel, a command for image-capturing operation is issued and then the image-capturing operation is performed. On the other hand, a touch panel enables an apparatus, which has been provided with the touch panel, to issue a command for activation of many other different functions in addition to the image capture function. For these reasons, many of image capturing devices incorporating touch panels are mobile information devices such as smart phones, which can be held by the user with a hand and can be manipulated in this state. Therefore, mobile information devices combined with an image capturing function (hereinafter, referred to as "mobile information device") will be described as illustrative embodiments of the invention.

FIG. 1 includes a front view and a back view illustrating a mobile information device 1 according to an illustrative embodiment of the invention.

FIG. 1(A) is a front view illustrating the mobile information device 1. In an example depicted in this front view, a display screen of a display 101 is assigned an image displaying region 104 in which an image of a subject is displayed, and an icon displaying region in which icons are displayed. In the icon displaying region, an image capture icon 105, a zoom icon 106, a mode selection icon 107, and a four-way arrow icon 108 are displayed. A touch panel 100 is laid over the display screen of the display 101 for successively detecting a finger's touch positions over time.

The image displaying region 104 is for displaying an image of a subject or a scene. The image displaying region 104 may be designed by imitating, for example, a physical structure of an LCD display screen used in a conventional digital camera. When the mobile information device 1 is aimed at a subject, an image of the subject is captured by the mobile information device 1, and the captured image is displayed live or in real time in the image displaying region 104, in the form of, for example, a moving picture or video of the subject. It is preferable that previously-captured images are recorded in a storage, the images are accessed from the storage, and the images are displayed as a played-back image in the image displaying region 104.

The image capture icon 105 is a visual representation on the display screen, which is actuated by the user to issue an image-capture command to the mobile information device 1 thereby causing the mobile information device 1 to perform image-capturing operation. The image capture icon 105 may be designed by imitating, for example, a physical shutter button used in a conventional digital camera. In response to a half-press of the image capture icon 108 via the user's finger press to the display screen at the image capture icon 108 within a range of pressing forces larger than zero and smaller than a predetermined threshold, the mobile information device 1 initiates focusing operation to focus on the subject. If the user goes on to perform a finger press on the image capture icon 108 with a pressing force which is, this time, equal to or larger than the predetermined threshold, then the mobile information device 1 initiates image-capturing operation for capturing the image of the subject.

The zoom icon 106 is a visual representation on the display screen, which is actuated by the user to issue a zoom command to the mobile information device 1 thereby causing the mobile information device 1 to perform zooming operation. The zoom icon 106 may be designed by imitating, for example, a physical zoom button used in a conventional digital camera. In response to the user's finger press to the zoom icon 106, the mobile information device 1 initiates a telephoto mode for (zooming in) or a wide-angle mode for (zooming out) the image displayed in the image displaying region 104, at a zoom speed determined as a function of the magnitude of the force with which the finger is pressed against the zoom icon 106.

The mode selection icon 107 is a visual representation on the display screen, which is actuated by the user to select one of a plurality of modes that can be executed by the mobile information device 1. The mode selection icon 107 may be designed by imitating, for example, a physical mode selection switch used in a conventional digital camera. In response to the user's finger movement (slide) across the region of the mode selection icon 107 in pressing contact with the mode selection icon 107 with a finger pressing force equal to or larger than a predetermined threshold, one of the pre-configured plurality of modes is selected as an effective mode, which reflects the finger touch position at which the finger is held after the above-mentioned finger movement, and the mobile information device 1 starts operating in the selected effective mode.

In a preferred example, modes that can be selected by the user with the mode selection icon 107 include:

(a) an image capture mode in which, in response to reception of a user command for image-capturing operation, the mobile information device 1 initiates the image-capturing operation; and (b) a playback mode in which, in response to reception of a user command for playing-back operation in which a previously-captured image is played back, the mobile information device 1 initiates the playing-back operation.

In addition, in a preferred additional example, the image capture mode is further classified into the following:

(c) an auto-focus image capture mode in which, in response to reception of a user command for auto-focus, the mobile information device 1 initiates the auto-focus; and (d) a manual image capture mode in which the user instructs the mobile information device 1 that the user adjusts focus and exposure manually.

In this example, the above-described image capture icon 105 is pressed while (c) the auto-focus image capture mode is implemented.

The four-way arrow icon 108 is a visual representation on the display screen, which is actuated by the user to move a cursor across the display screen in order to select a portion of the image of the subject as a focus target. The four-way arrow icon 108 may be designed by imitating, for example, a physical four-way arrow key used in a conventional digital camera.

In an example, the four-way arrow icon 108 includes four virtual move keys (arrow keys) actuated by the user to move the cursor on the display screen in upward, downward, leftward and rightward directions, respectively, and a virtual input key at the center of those move keys. In this example, the user repeats selecting one of the four move keys and then pressing the selected move key with a finger, thereby moving the cursor on the display screen upward, downward, leftward or rightward direction until the cursor reaches the focus target, the user, if the cursor reaches the focus target, holds the cursor, and the user, at this moment, presses a finger to the input key, thereby selecting a portion of the image displaying region 104 as a region to focus on (e.g., a pre-selected rectangular region).

It is preferable that every one of those image capture icon 105, zoom icon 106, mode selection icon 17 and four-way arrow icon 108 is displayed on the display screen somewhere in a region of points which can be easily reached by the user with a finger of the hand with which the user holds the mobile information device 1. That finger is, actually, a thumb of the fingers of that hand, which has no use for holding the mobile information device 1. More specifically, in the example depicted in FIG. 1(A), the mobile information device 1 is manipulated by the user with a finger of the user's right hand used for holding the mobile information device 1, that is, for example, a thumb. In this implementation, given a region of points that can be easily reached by the user with the thumb by rotating the finger around the root of the finger, every one of those four icons 105, 106, 107 and 108 is displayed on the display screen of the display 101, in a region on a "right-hand side when facing front face" (i.e., on the right of the user who is directly facing the front face of the mobile information device 1).

It is noted that, preferably, in preparation for cases where the user holds the mobile information device 1 with the left hand and manipulates the mobile information device 1 with a finger of the left hand, those four icons 105, 106, 107 and 108 are displayed on the display screen at variable positions, which allows every one of those icons 105, 106, 107 and 108 to be displayed on the display screen of the display 101, in a region on a "left-hand side when facing front face" (i.e., on the left of the user who is directly facing the front face of the mobile information device 1).

In general, the user's manipulation of the touch panel 100 with a finger (e.g., the thumb) of the hand with which the user holds the mobile information device 1 can activate the mobile information device 1 to invoke information processing and a communication function. For this reason, designing the mobile information device 1 so that the user's manipulation of the touch panel 100 with the same finger can also activate the same mobile information device 1 to serve as an image capturing device provides the mobile information device 1 with far greater ease-of-use, because the designing would make it unnecessary to shift the user's hands with which the user holds the mobile information device 1.

Figure 1B:
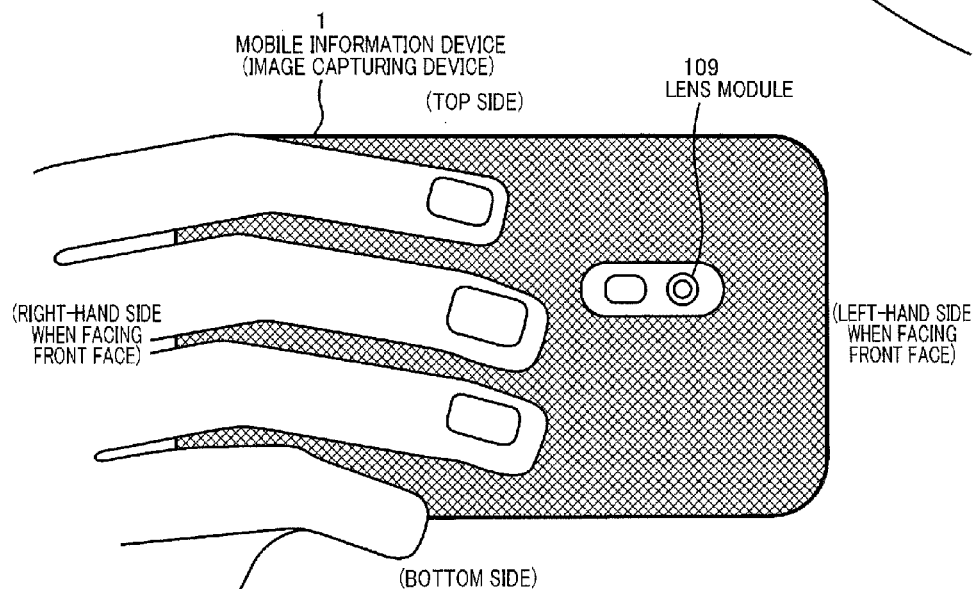

FIG. 1(B) is a back view illustrating the mobile information device 1. As illustrated in this back view, the mobile information device 1 is equipped with a lens module 109 serving as a light reception unit for receiving light from the subject and introducing the light into the mobile information device 1. The lens module 109 is located in the back face of the mobile information device 1 at a position on the "left-hand side when facing front face" (on the right-hand side in FIG. 1(B)).

It is possible that the user changes the hands with which the user holds the mobile information device 1 in order to invert the mobile information device 1 vertically from the position depicted in FIG. 1(B), so that the lens module 109 is located on the "right-hand side when facing front face," and that, in this state, the user manipulates the mobile information device 1 with a finger (the thumb) of the left hand with which the user holds the mobile information device 1. In this scenario, those image capture icon 105, zoom icon 106, mode selection icon 17 and four-way arrow icon 108 are displayed on the display screen of the display 101 in a region on the "left-hand side when facing front face," which can be easily reached by the user with the finger of the left hand.

It is noted that, similarly with the image capture icon 105, etc., the image displaying region 104 can be displayed at a desired position within the touch panel 100. In an example, the image displaying region 104 is displayed on the display screen at a position oppositely behind the lens module 109. In this example, the subject, the lens module 109, the image displaying region 104 and the position of an eye with which the user gazes at the image displaying region 104 are rectilinearly aligned together. This arrangement allows the user to use the mobile information device 1 with a feel as if the image displaying region 104 received frontally light from the subject via the lens module 109.

FIG. 2 includes a front view and a back view illustrating the mobile information device 1 when used in a different mode from that of FIG. 1(A), respectively.

Figure 2A:
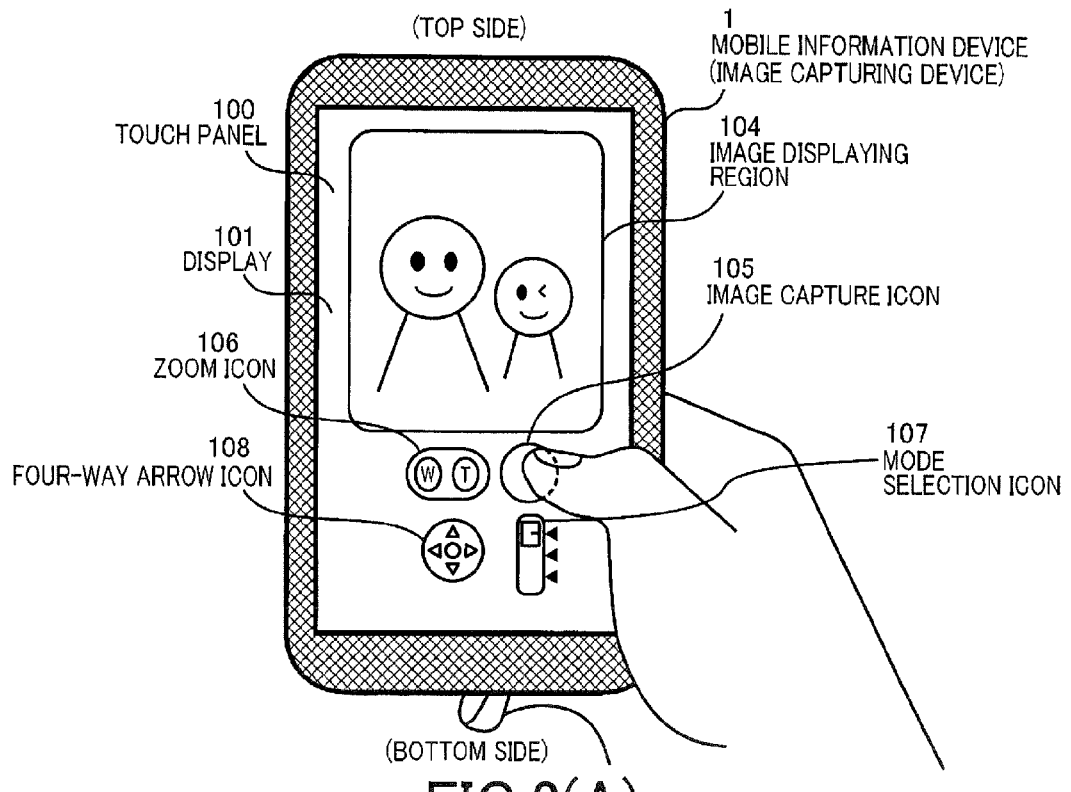
FIGS. 2(A) and 2(B) are a front view and a back view illustrating the mobile information device depicted in FIG. 1(A), when used in a different mode from that of FIG. 1(A), respectively.

FIG. 2(A) is a front view illustrating the mobile information device 1. In an example depicted in this front view, the display screen of the display 101 is assigned the image displaying region 104, in which the image of the subject is displayed, and the icon displaying region, in which the icons are displayed. In the icon displaying region, the image capture icon 105, the zoom icon 106, the mode selection icon 107, and the four-way arrow icon 108 are displayed.

In the example depicted in FIG. 2(A), every one of those four icons 105, 106, 17 and 108 is displayed on the display screen somewhere in a region of points which can be easily reached by the user with the thumb of the right hand with which the user holds the mobile information device 1, that is, somewhere in a bottom half of the display screen in the example depicted in FIG. 2(A). It is noted that, even when the user holds the mobile information device 1 with the left hand, those four icons 105, 106, 17 and 108 are displayed in the bottom half of the display screen of the display 101.

Figure 2B:
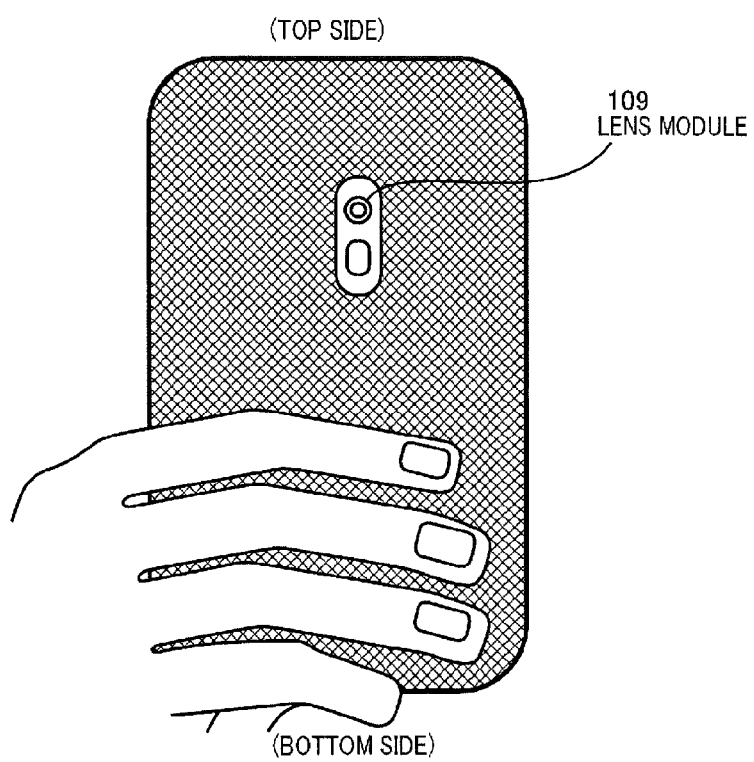

FIG. 2(B) is a back view illustrating the mobile information device 1. In an example depicted in this back view, the lens module 109 is located in a top half of the back face of the mobile information device 1. This prevents a finger of the hand with which the user holds the mobile information device 1 from occluding an object lens of the lens module 109, irrespective of whether the hand is a right hand as illustrated in this figure or a left hand. As a result, incident light on the lens module 109 is not worsened and image capture is performed with high quality.

As described above with reference to FIGS. 1 and 2, in the present embodiment, every one of the controls to be actuated by the user, which is to say, the image capture icon 105, the zoom icon 106, the mode selection icon 107 and the four-way arrow icon 108 is in the form of a virtual button (switch, key) displayed on the display screen of the display 101, which gives easier adjustment of the position of each button than a physical button gives. This allows layout of those icons 105, 106, 107 and 108 within in a range of positions which can be easily reached by the user with a finger of a hand with which the user holds the mobile information device 1. This allows the user's manipulation of the mobile information device 1 with a finger of the hand with which the user holds the mobile information device 1 to invoke a variety of events associated with the image-capturing operation by the mobile information device 1.

Further, the capability of displaying those icons 105, 106, 107 and 108 at adjustable positions allows those icons 105, 106, 107 and 108 to be laid out in the mobile information device 1 so that the user can correctly press the display screen at those icons 105, 106, 107 and 108 with a finger of the hand with which the user holds the mobile information device 1, whether, during an image capture process, the user uses the mobile information device 1 in a horizontal orientation (FIGS. 1(A) and 1(B)) or a vertical orientation (FIGS. 2(A) and 2(B)).

Figure 3:
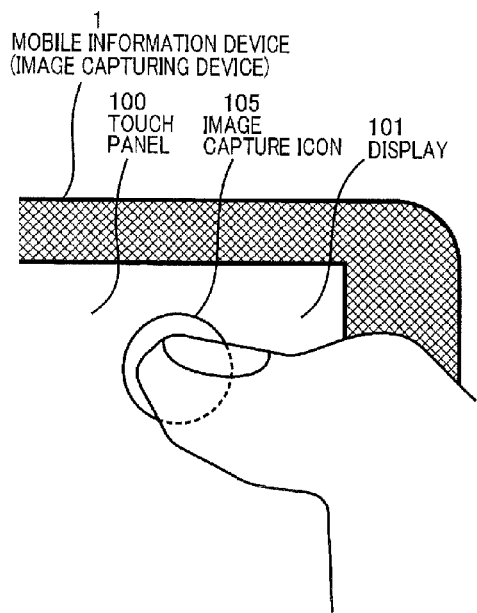
FIG. 3(A1) is a fragmental front view illustrating a portion of a front face of the mobile information device depicted in FIG. 1(A), along with an example of an image capture icon displayed, FIG. 3(A2) is a side view illustrating a user's finger gesture for actuating the image capture icon, FIG. 3(B1) is a fragmental front view illustrating the portion of the front face of the mobile information device depicted in FIG. 1(A), along with another example of the image capture icon, and FIG. 3(B2) is a fragmental front view illustrating the portion of the front face of the mobile information device depicted in FIG. 1(A), along with still another example of the image capture icon.
Figure 3:
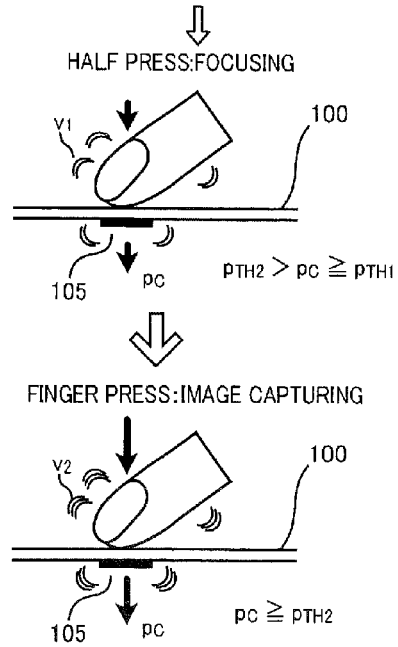
Figure 3:
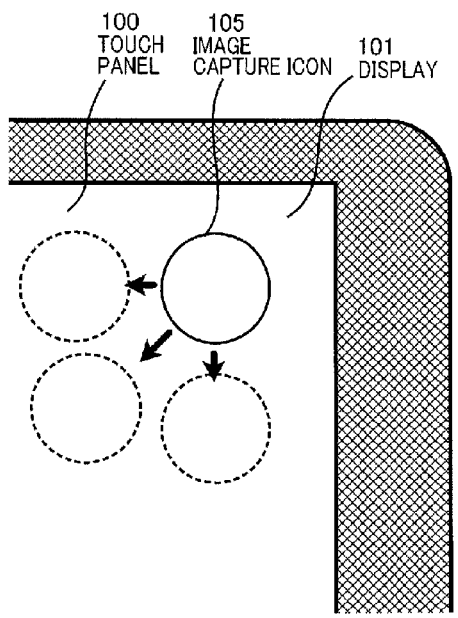
Figure 3:
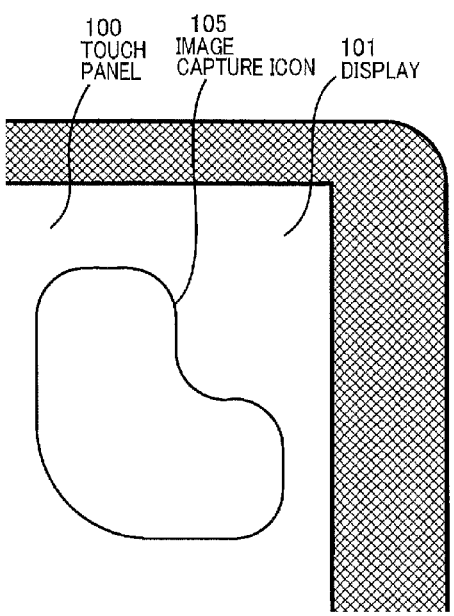

FIG. 3 includes a fragmental front view illustrating a portion of a front face of the mobile information device 1, along with an example of the image capture icon 105 displayed, and a schematic view illustrating the user's actuation of the image capture icon 105 with a finger.

FIG. 3(A1) illustrates a portion of the front face of the mobile information device 1, along with an example of the image capture icon 105 displayed. In an example depicted in FIG. 3(A1), the image capture icon 105 is displayed on the display screen of the display 101 at a position that allows the user to press the image capture icon 105 with a finger (the thumb) of the hand with which the user holds the mobile information device 1.

For issuing an image capture command, the user starts with a finger touch to the display screen in the region of the image capture icon 105 being displayed. That is, the user moves the finger across the display screen to a point that overlaps with the region of the image capture icon 105 being displayed. Subsequently, the user visually perceives the image displayed in the image displaying region 104, and during that process, presses the finger to the region of the image capture icon 105 being displayed, in order to issue a command to focus on the subject in the displayed image. At this moment, a pressing force $p_C$ with which the finger is pressed against the display screen takes a value satisfying the condition expressed with the following formula, with a first threshold being denoted as $p_{TH1}$, and a second threshold being denoted as $p_{TH2}$ $$p_{TH2} > p_C \geq p_{TH1}, \qquad (1),$$

as illustrated in FIG. 3(A2).

In this regard, the first threshold $p_{TH1}$ can be set to a value within a range, for example, from 0.5 N to 1.0 N, and the second threshold $p_{TH2}$ can be set to a value within a range, for example, from 1.0 N to 2.0 N. It is noted that the finger's pressing force $p_C$ is detected by pressing-force detectors 102 (FIG. 5) as described below.

As a comparative description of a magnitude of a pressing force $p_C$ with a motion conducted by the user, a finger press with the pressing force $p_C$ satisfying Formula (1) is comparable to a half press of a physical shutter button, if a virtual shutter button represented by the image capture icon 105 is replaced with the physical shutter button. In response to this half press, the mobile information device 1 is commanded to perform the focusing operation and the mobile information device 1 performs the focusing operation. The focusing operation is the one in which the mobile information device 1 focuses the lens on a user-desired portion of the image of the subject.

In an example, the focusing operation is the one in which a cursor is displayed in the image displaying region 104, and an image within a preselected focus area centered at the position of the cursor displayed is focused on. In this example, the position of the cursor (focus area) is user-adjustable, but the cursor (focus area) may be stayed at a preselected position, for example, the center position of the image displaying region 104.

Subsequently, the user confirms that the subject has become focused, and further presses the finger to the image capture icon 105 more strongly for invoking image capture. At this moment, the finger pressing force $p_C$ takes a value satisfying the condition expressed with the following formula:

$$p_C \geq p_{TH2}, \qquad (2)$$

as illustrated in the same FIG. 3(A2).

As a comparative description of a magnitude of a pressing force $p_C$ with a motion conducted by the user, a finger press with the pressing force $p_C$ satisfying Formula (2) is comparable to a press (e.g., a full press) of a physical shutter button, if a virtual shutter button represented by the image capture icon 105 is replaced with the physical shutter button. In response to this full press, the mobile information device 1 is commanded to perform the image-capturing operation and the mobile information device 1 performs the image-capturing operation.

The image-capturing operation is the one in which imaging light representative of the image of the subject (e.g., real external light) is captured. In an example, the image-capturing operation is the one in which the imaging light representative of the subject, after exiting the lens module 109, enters an image capture unit 111 (FIG. 5) as described below at a predetermined shutter speed or for a predetermined exposure time, and the incoming light is converted into an electric signal via the image capture unit 111.

As described above, the mobile information device 1 operates such that, in response to the user's half press of the image capture icon 105 with a finger applying the pressing force $p_C$ satisfying Formula (1) (i.e., $p_{TH2} > p_C \geq p_{TH1}$), the focusing operation is commanded and executed. If this is followed by the user's press (i.e., full press) of the image capture icon 105 with a finger applying the pressing force $p_C$ satisfying Formula (2) (i.e., $p_C \geq p_{TH2}$), then the image-capturing operation is commanded and executed.

Thus, the mobile information device 1 allows the user to manipulate the image capture icon 105 while experiencing a feel of manipulation simulating a real feel of manipulation that the user would experience if the user presses a physical shutter button used in a conventional digital camera, thereby operating the mobile information device 1 to invoke the focusing operation and the image-capturing operation.

Further, in the mobile information device 1, the conditions to be met for the user's manipulation to authorize the mobile information device 1 to perform the focusing operation and the image-capturing operation include the conditions on the magnitude of a finger pressing force $p_C$. In other words, in order for the user to command and operate the mobile information device 1 to perform the focusing operation and the image-capturing operation, what the user is required to do to the image capture icon 105 is not a pure finger touch but a finger press. The mobile information device 1 would prevent the user's unintended touches from invoking incorrect operation in the mobile information device 1. Further, the mobile information device 1 would allow the user to perform responsive motions, other than pure touches.

Additionally, the mobile information device 1 would only require the user to perform a series of motions on the image capture icon 105 (touch panel 100) (a soft press and a hard press both on the same region (a press with an increasing pressing force)), without sacrificing improvement in the maneuverability over prevention of incorrect operation.

It is noted that, in the present embodiment, practically, the mobile information device 1 makes a determination as to whether to initiate the focusing operation, not using the conditions expressed with Formula (1), but using the following formula:

$$p_C \geq p_{TH1}, \qquad (3),$$

as illustrated at step S605 (FIG. 6) described below. The reason is that, in the present embodiment, the user's press of the image capture icon 105 is expected during the auto-focus image capture mode (the user's selection of the auto-focus image capture mode clearly indicates that the user intends to capture an image after the auto-focus is performed). In other words, even if the user rapidly presses the image capture icon 105 with a large magnitude of the pressing force $p_C$ ($p_C \geq p_{TH2}$) it is guaranteed that the focusing operation is performed prior to the image-capturing operation.

In this regard, the first threshold $p_{TH1}$ is preferably larger than zero ($p_{TH1} > 0$). This allows the user to experience a feel of manipulation simulating a real feel of manipulation that the user's half press with some intensity initiates the focusing operation. This first threshold $p_{TH1}$, however, may alternatively be set to zero. In that case, substantially, the user's pure touch to the image capture icon 105 initiates the focusing operation.

In addition, in the present embodiment, at a time during the focusing operation, a time immediately after the focusing operation, or a time before and after the focusing operation, a haptic feedback arrangement 102 (FIG. 5) described below, in response to the user's press (half-press) of the image capture icon 105 serving as a virtual shutter button with a finger applying a pressing force equal to or smaller than a predetermined value of force, imparts vibrations to the finger, as a response to the user's press. In the present embodiment, this allows the user to experience a feel of manipulation simulating a real feel of manipulation that the user would experience if the user pressed a finger halfway (a half press or halfway press) to a physical shutter button, in response to the user's finger soft press of the image capture icon 105 serving as a virtual shutter button for commanding the focusing operation.

In other words, the present embodiment can impart vibrations to the finger in a suitable manner that causes the user to misinterpret the vibrations as if the user pressed a physical shutter button halfway. This allows the user to physically experience the reception of the halfway press in the mobile information device 1, thereby providing the user with a positive feel of manipulation.

In an example of a scenario in which vibrations are produced in a suitable manner that causes the user to misinterpret the vibrations as if the user pressed a finger to a physical shutter button halfway, if, at first, the finger's pressing force $p_C$ on the image capture icon 105 increases, then vibrations $v_1$ are imparted to the finger with an increasing intensity with the magnitude of the pressing force $p_C$. If, subsequently, the pressing force $p_C$ becomes closer to the first threshold $p_{TH1}$ and eventually exceeds the first threshold $p_{TH1}$, then the vibrations $v_1$ rapidly increase their intensity. This makes the user to misperceive the vibrations as if the user pressed the finger to a physical shutter button to a point where the physical shutter button hit something lightly (where the reaction force started exhibiting a rapid increase).

Further, in the present embodiment, at a time during the image-capturing operation, a time immediately after the image-capturing, or a time before and after the image-capturing operation, the haptic feedback arrangement 102 (FIG. 5) allows the user to experience a feel of manipulation simulating a real feel of manipulation that the user would experience if the user fully pressed a finger to a physical shutter button, in response to the user's finger hard press of the image capture icon 105 serving as a virtual shutter button for commanding the image-capturing operation.

In other words, the present embodiment can impart vibrations to the finger in a suitable manner that causes the user to misinterpret the vibrations as if the user performed a full-press of a physical shutter button (bottomed the physical shutter button). This allows the user to physically experience the reception of the press (full press) in the mobile information device 1, thereby providing the user with a positive feel of manipulation.

In an example of a scenario in which vibrations are produced in a suitable manner that causes the user to misinterpret the vibrations as if the user actually pressed (fully pressed) a finger to a physical shutter button, the finger, which the vibrations $v_1$ had been imparted at the focusing operation, is further pressed against the image capture icon 105 with a larger pressing force $p_C$. Because of this, if the pressing force $p_C$ becomes closer to the second threshold $p_{TH2}$, then vibrations $v_2$ are imparted to the finger with an increasing intensity with the magnitude of the pressing force $p_C$. The intensity of the vibrations $v_2$ is set to be higher than that of the vibrations $v_1$. This causes the user to misperceive the vibrations as if the user pressed a finger to a physical control so that it bottomed (figurative feel of button bottoming), because, in response to the transition of the image capture icon 105 from a halfway-pressed status to a fully-pressed status, there is an increase in the virtual reaction to the user's finger press to the display screen, which is exerted from the display screen to the finger.

If, subsequently, the pressing force $p_C$ becomes equal to or larger than the second threshold $p_{TH2}$, then the vibrations $v_2$ rapidly lose their intensity. This makes the user to feel as if, after the user's additional press of a physical shutter button that had been brought into a point where the physical shutter button lightly hit something, the user finally felt that the physical shutter button lost its strength. In other words, in response to the user's additional press to the image capture icon 105 placed in the fully-pressed status, there is a rapid drop in the virtual reaction to the user's finger press to the display screen, which is exerted from the display screen to the finger, and this makes the user to misperceive the rapid drop as if, because the user pressed a physical control so that it bottomed and then the user reduced the pressing force, the physical control started moving back to the initial position (figurative feel of button releasing).

FIG. 3(B1) is a fragmental front view illustrating the portion of the front face of the mobile information device 1, along with an alternative example of the image capture icon 105 to that depicted in FIG. 3(A1), and FIG. 3(B2) is a fragmental front view illustrating the portion of the front face of the mobile information device 1, along with an alternative example of the image capture icon 105 to those depicted in FIGS. 3(A1) and 3(B1).

As illustrated in FIG. 3(B1) in dotted line, it is preferable that the image capture icon 105 is displayed on the display screen of the display 101 at a variable position so that the image capture icon 105 can be easily pressed with a finger (the thumb) of the hand with which the user holds the mobile information device 1.

In general, the image capturing is one of the events that should not be invoked due to incorrect operation of the mobile information device 1, in particular, and conventional apparatuses are configured such that the image capturing is invoked in response to the user's input via a physical shutter button. As a result, like in the present embodiment where the device is configured to capture images in response to the user's input via the virtual image-capture-icon 105, it is preferable that the image capture icon 105 is displayed at a variable position, which allows the image capture icon 105 is displayed at a position suitable enough to fit in with the user. It is even helpful when the user manipulates the mobile information device 1 with a finger of the hand holding the mobile information device 1. This improves the maneuverability of the mobile information device 1, while preventing the mobile information device 1 from incorrect operation.

Further, it is also preferable that the image capture icon 105 is displayed on the display screen of the display 101 also with a variable size (the size of the region of the image capture icon 105 being displayed) so that the image capture icon 105 can be easily pressed with a finger (the thumb) of the hand with which the user holds the mobile information device 1. Still further, it is still also preferable that the image capture icon 105 is displayed on the display screen of the display 101 also with a variable shape so that the shape can vary depending on the situation.

In an example, an example of the image capture icon 105 depicted in FIG. 3(B2) is larger in size than the image capture icon 105 depicted in FIG. 1(A), and is not circular in shape but sector-shaped or L-shaped configured to cover a region of points that can be reached by a tip of a thumb of the user, meaning that this example is different in size and shape from the image capture icon 105 depicted in FIG. 1(A). This provides the mobile information device 1 with an improved level of maneuverability, while averting incorrect operation of the mobile information device 1.

Figure 4:
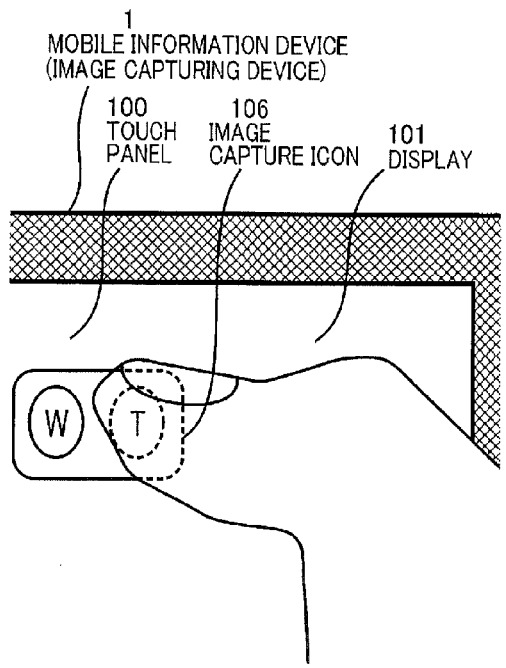
FIG. 4(A1) is a front view illustrating a portion of a front face of the mobile information device depicted in FIG. 1(A), along with an example of a zoom icon displayed, FIG. 4(A2) is a side view illustrating a user's finger gesture for actuating the zoom icon, FIG. 4(B1) is a fragmental front view illustrating a portion of the front face of the mobile information device depicted in FIG. 1(A), along with an example of a mode selection button, and FIG. 4(B2) is a side view illustrating a user's finger gesture for actuating the mode selection button.
Figure 4:
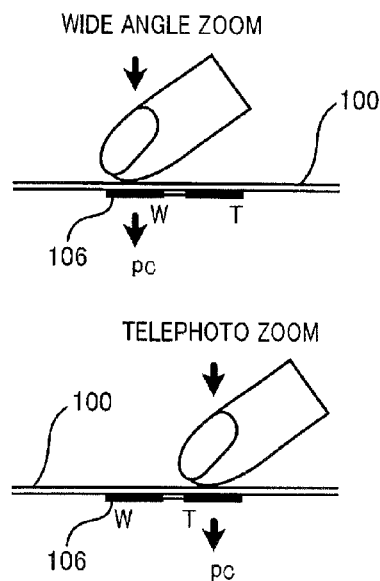
Figure 4:
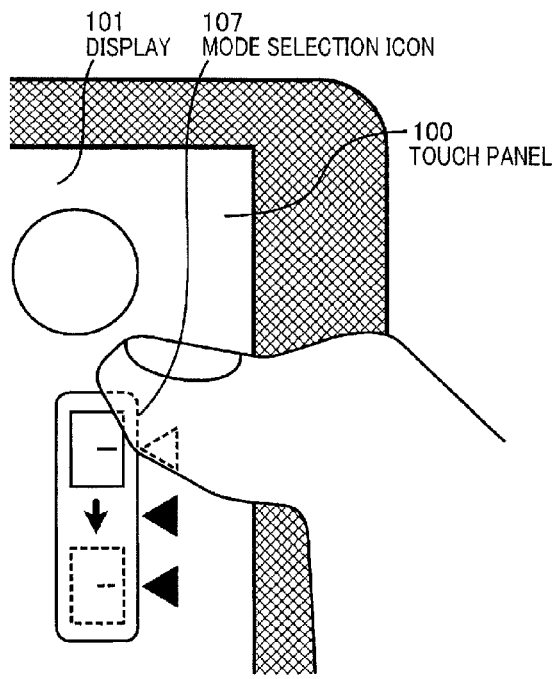
Figure 4:
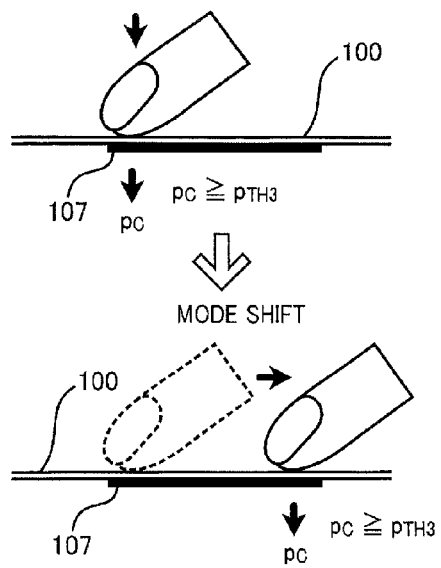

FIG. 4 includes a fragmental front view illustrating the mobile information device 1 and a schematic view illustrating a user's inputs via a finger, for explanation of a zoom icon 106 and a mode selection icon 107 both in the mobile information device 1.

FIG. 4(A1) illustrates a portion of the front face of the mobile information device 1, along with an example of the zoom icon 106 displayed. In an example depicted in FIG. 4(A1), the zoom icon 106 is displayed on the display screen of the display 101 at a position that can be easily reached by a finger (thumb) of the hand with which the user holds the mobile information device 1.

For commanding the zooming operation, the user begins with a finger touch to the zoom icon 106. In other words, the user moves the finger until the finger touch position overlaps with a region of the zoom icon 106 being displayed. More specifically, the user moves the finger until the finger touch position overlaps with a user-desired one of a wide-lens-view indicator W and a telephoto-view indicator T both of which are included in the zoom icon 106. The user goes on to press the zoom icon 106 with a finger in order to display the image in the image displaying region 104 with a desired scale factor, while ascertaining the image displayed in the image displaying region 104. More specifically, as illustrated in FIG. 4(A2), the user presses the display screen at one of the wide-lens-view indicator W and the telephoto-view indicator T with a pressing force $p_C$.

In response to a press on the wide-lens-view indicator W, a zoom-speed determining unit 123(FIG. 5) described below determines a zoom speed at which an image is zoomed in a wide lens view mode (with a reduced scale factor), as a function of the magnitude of a pressing force $p_C$. In an example, within a range of the pressing forces $p_C$ equal to or larger than a threshold $p_{THW}$, the zoom speed may be increased in proportion to the value of $(p_C-p_{THW})$. In that example, the larger the pressing force with which the user presses the display screen at the wide-lens-view indicator W with a finger, the higher the zoom speed at which the image of the subject is zoomed so that the view of the image shifts in a direction from the telephoto view to the wide lens view (the speed at which the scale factor of the image reduces is increased).

In contrast, in response to a press on the telephoto-view indicator T, the same zoom-speed determining unit 123(FIG. 5) determines a zoom speed at which an image is zoomed in a telephoto view mode (with an enlarged scale factor), as a function of the magnitude of a pressing force $p_C$. In an example, within a range of the pressing forces $p_C$ equal to or larger than a threshold $p_{THT}$, the zoom speed may be increased in proportion to the value of $(p_C-p_{THT})$. In that example, the larger the pressing force with which the user presses the display screen at the telephoto-view indicator T with a finger, the higher the zoom speed at which the image of the subject is zoomed so that the view of the image shifts in a direction from the wide lens view to the telephoto view (the speed at which the scale factor of the image increases is increased).

It is noted that the wide-lens-view indicator W and the telephoto-view indicator T of the image capture icon 105 are preferably displayed on the display screen in a manner that causes the user to visually misperceive those indicators W and T as if, in response to a finger press, these indicators W and T were physically depressed down into the mobile information device 1 (these indicators W and T were recessed or concaved).

FIG. 4(B1) illustrates a portion of the front face of the mobile information device 1, along with an example of the mode selection button 107. In an example depicted in FIG. 4(B1), the mode selection icon 107 is displayed on the display screen of the display 101 at a position that can be easily reached by a finger (thumb) of the hand with which the user holds the mobile information device 1. It is noted that a plurality of modes one of which can be selected via the mode selection icon 107 include the auto-focus image capture mode, the manual image capture mode and the playback mode, as described above.

For making a mode selection, the user begins with a finger touch to the mode selection icon 107. In other words, the user moves the finger until the finger touch position overlaps with a region of the mode selection icon 107 being displayed. More specifically, the user moves the finger until the finger touch position overlaps with a region of a slide bar of the mode selection icon 107 being displayed. The user goes on to moves (slides) the finger in pressing contact with the slide bar, in order to issue a command for selection of a desired one of the modes.

At this moment, the finger pressing force $p_C$ takes a value satisfying the condition expressed with the following formula, with a third threshold denoted as $p_{TH3}$:

$$p_C \geq p_{TH3}, \quad (4)$$

as illustrated in FIG. 4(B2). In this regard, the third threshold $p_{TH3}$ can be set to a value within a range, for example, from 0.5 N to 2.0 N.

The user slides the finger up to a position assigned a desired mode (i.e., a destination to be reached by the moving finger) while pressing the slide bar of the mode selection icon 107 with the pressing force $p_C$ satisfying Formula (4). In FIG. 4(B1), a rectangular block is representative of the slide bar (its current position is indicated in solid lines, and its possible alternative position is indicated in dotted lines), and a plurality of triangular marks are representative of a plurality of positions that a plurality of selectable modes (i.e., possible stop positions of the slide bar). In response to the user's press on the slide bar, the slide bar slides with the finger. The user slides the finger with the slide bar so that the finger touch position moves to a position that allows the slide bar to overlap with one of the plurality of possible stop positions that correspond to the plurality of modes. If the finger touch position moves and then stops at one of the possible stop positions, then one of the modes which corresponds to the stop position is selected as an active mode, and eventually the active mode is implemented.

As described above, the user manipulates the mobile information device 1 while selectively pressing the zoom icon 106 and the mode selection icon 107 with a finger. This allows the user to experience a feel of manipulation simulating a real feel of manipulation that the user would experience if the user actually manipulates a physical zoom button or mode switch in a conventional digital camera. Further, the mobile information device 1 would allow the user's responsive motions, other than pure touches (the user's inputs that require the user to apply a force that cannot be reached via a pure touch), thereby averting incorrect operation of the mobile information device 1.

Further, during the zooming process, the haptic feedback arrangement 102 (FIG. 5) described below can impart vibrations to the finger with an intensity varying with the zoom speed. In an example, the haptic feedback arrangement 102 imparts vibrations to the finger with an increasing intensity with the zoom speed on an increase. This allows the user to haptically experience the event that the mobile information device 1 has received the user's inputs for zooming, thereby providing the user with a positive feel of manipulation.

Further, during the mode selection process, the haptic feedback arrangement 102 (FIG. 5) described below can impart vibrations to the finger as a function of the position of the slide bar of the mode selection icon 107. In an example, in response to the slide bar's sliding up to one of the possible stop positions which indicates a desired one of the modes, the haptic feedback arrangement 102 imparts brief or short-term vibrations (e.g., the vibrations that cause the user to misinterpret the vibrations as if they sounded a click, the vibrations that cause the user to misinterpret the slide bar as if it were formed using a physical detent mechanism) to the finger. This allows the user to misinterpret the slide bar as if it were mechanically fitted into a recess fixedly positioned, and haptically experience the event that the mobile information device 1 has received the user's inputs for mode selection, thereby providing the user with a positive feel of manipulation.

It is noted that the zoom icon 106 and the mode selection icon 107 have forms that are not limited to those described above. For example, the mode selection icon 107 may be designed as an imitation of well-known physical buttons, dials, etc. In any rate, the mode selection icon 107 is designed to make a selection of one of the plurality of modes as a function of the position of one of a plurality of possible stop positions with which the finger touch position overlaps, the possible stop position being within the region of the mode selection icon 107 displayed.

Figure 5:
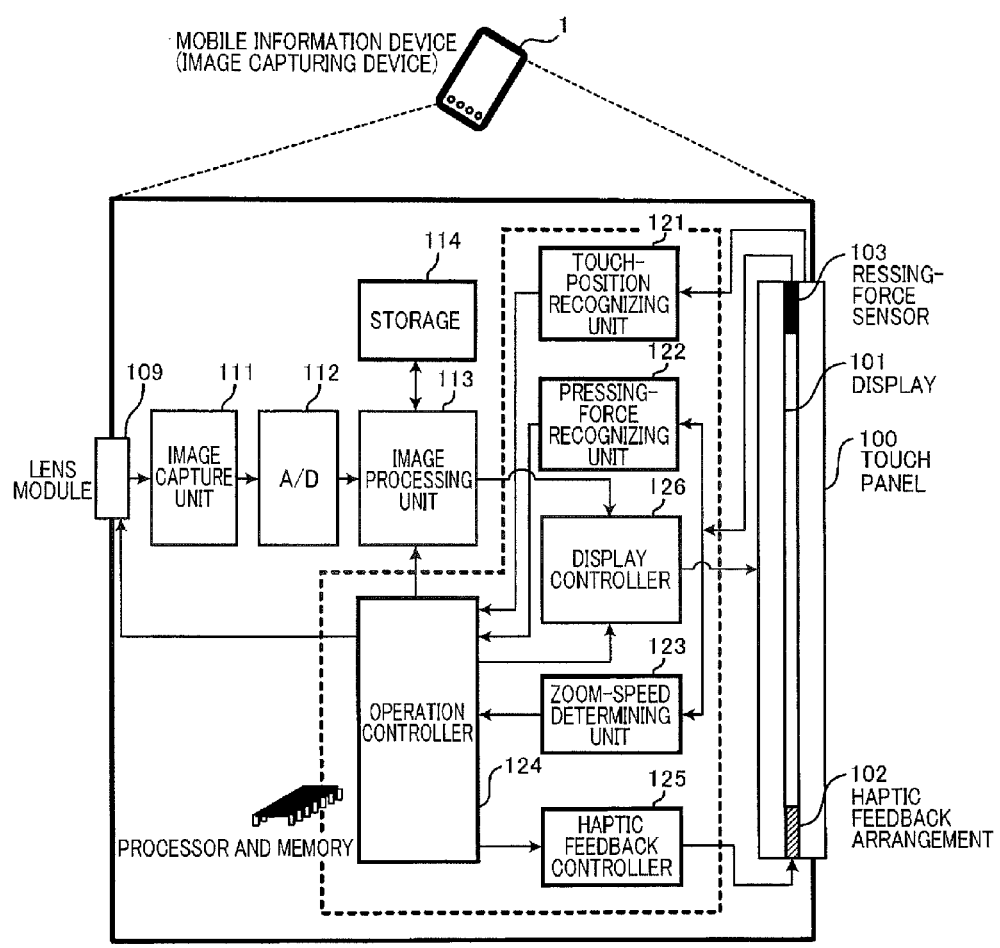
FIG. 5 is a functional block diagram illustrating an example configuration of the mobile information device depicted in FIG. 1(A).

FIG. 5 is a functional block diagram illustrating an example of the configuration of the mobile information devices 1.

As illustrated in FIG. 5, the mobile information device 1 includes the touch panel 100, the display 101, the haptic feedback arrangement 102, the pressing-force sensors 103, the lens module 109, the image capture unit 111, an A/D converter 112, an image processing unit 113, a storage 114, and a processor and memory.

The processor and memory incorporates a touch-position recognizing unit 121, a pressing-force recognizing unit 122, a zoom-speed determining unit 123, an operation controller 124, a haptic feedback controller 125, and a display controller 126. The processor and memory executes an image-capturing control program to provide its function.

As well known, the processor and the memory together constitute a computer. The memory has previously stored therein the image-capturing control program for performing the image-capturing method as outlined above. The memory is an example of a computer-readable and non-transitory storage medium having stored therein the image-capturing control program.

The display 101 has the image displaying region 104, and the icon displaying region for displaying the image capture icon 105, the zoom icon 106, the mode selection icon 107, and the four-way arrow icon 108, on the display screen. The touch panel 100 is laid over the display screen of the display 101, and senses successive locations of the user's finger touch points on the display screen over time. The touch panel 100 may be in the form of a projected capacitive touch panel, a surface capacitive touch panel, a resistive touch panel, an ultra-sonic surface acoustic wave touch panel, an infra-red touch panel, or the like.

As described above, the touch panel 100 is laid over the display screen of the display 101, and so, technically, the user cannot touch the display screen of the display 101 with a finger, and what the user can touch is an exposed surface or a touch screen of the touch panel 100. Substantially, however, the user perceives as if an image were displayed on the touch screen of the touch panel 100, and so the touch screen of the touch panel 100 is equivalent to the display screen of the display 101. For the sake of explanation, therefore, throughout the specification, the surface of a control section of the mobile information device 1 is referred to as a display screen, irrespective of which component of the mobile information device 1 forms the surface.

As in the present embodiment, when the display 101 and the touch panel 100 are constructed in a so-called dual layer type in which a display function and a touch panel function are provided by separate devices, the display screen of the display 101 and the touch screen of the touch panel 100 are separate from each other, with the touch screen being laid over the display screen, and alternatively, when the display 101 and the touch panel 100 are constructed in a so-called single layer type in which a display function and a touch panel function are provided by a single device, the display screen of the display 101 and the touch screen of the touch panel 100 are the same component.

The haptic feedback arrangement 102 vibrates the touch panel 100 to impart to the finger held in contact with the above-described control which is each of those icons 105-108, haptic feedback as a response. The haptic feedback arrangement 102 may be, for example, in the form of a piezoelectric actuator formed with piezoelectric materials such as PZT (Lead Zirconate Titanate).

The pressing-force sensors 103 detect a pressing force $p_C$ with which the user presses each of the above-described icons 105-108 (touch panel 100) with the finger. In an example, the pressing-force sensor 103 is disposed at each of four corners of the touch panel 100 (or a greater number of corners or a smaller number of corners that are remote from each other), and the pressing force $p_C$ is measured by totaling four component forces with which the pressing-force sensors 103 are pressed at the four corners, respectively, by deflection created in the touch panel 100 with the pressing finger (each component force is detected by each pressing-force sensor 103 disposed at each of the four corners).

In an example, the pressing-force sensor 103 may be in the form of a piezoelectric sensor formed with piezoelectric materials such as PZT. In another example, the pressing-force sensor 103 can be used to serve as a haptic feedback arrangement, instead of or in addition to the haptic feedback arrangement 102 formed with a piezoelectric actuator.

The pressing force $p_C$ is an example of a physical quantity expressing the intensity of the user's finger touch on the touch screen. The intensity of a finger touch can be expressed by at least one of the pressing force $p_C$, the size of an area in which the finger touches the touch screen, a change in electrical property in response to a finger touch on the touch screen, and a change in temperature in response to a finger touch on the touch screen. Therefore, in some other embodiments, the pressing force $p_C$ may be replaced with an alternative physical quantity that is categorized as the intensity of a finger touch, to provide the same function.

The lens module 109 is, for example, a light receptor including a zoom lens, a focus lens, a lens driver for displacing those lens in a direction of an optical axis, and an optical stop. Light emitting from the subject enters the thus-configured lens module 109 where the scale factor, the degree of focus, the quantity of light, etc. of the emitted light are adjusted, and then the emitted light enters the image capture unit 111.

The image capture unit 111 includes a charge coupled device (CCD) for receiving light from the lens module 109, and performing photoelectric conversion, a signal processor for performing processing including gain control for an image signal from the CCD, etc. The processed image signal exiting the image capture unit 111, after being converted into a digital signal by the A/D convertor 112, is supplied to the image processing unit 113.

The image processing unit 113 processes the digital image signal from the A/D convertor 112 in a suitable manner, thereby producing captured-image data. Upon reception of the user's command for the image-capturing operation from the operation controller 124, the image processing unit 113 records the captured-image data in the storage 114.

The image processing unit 113 delivers a video signal to the display controller 126, and causes the display controller 126 to display live, captured image of the subject in the format of a video or moving picture in the image displaying region 104 (display 101). The image processing unit 113 preferably delivers the captured-image data that has been recorded in the storage 114, and causes the display controller 126 to display the image represented by the captured-image data, as a played-back image in the image displaying region 104 (display 101). The storage 114 may be, for example, a built-in semiconductor memory, or a detachable memory card.

The touch-position recognizing unit 121 inputs finger-touch-position signals indicative of finger touch positions from the touch panel 100, determines whether or not the finger touch position has an overlap with a region of each of the image capture icon 105, the zoom icon 106, the mode selection icon 107 and the four-way arrow icon 108 being displayed, and outputs the determination to the operation controller 124.

The pressing-force recognizing unit 122 inputs pressing-force signals from the pressing-force sensors 102, makes a comparison between the finger pressing force $p_C$, and each of the predetermined threshold $p_{TH1}$ (FIG. 3), threshold $p_{TH2}$ (FIG. 3) and threshold $p_{TH3}$ (FIG. 4), and outputs the comparisons to the operation controller 124.

The zoom-speed determining unit 123 inputs the pressing-force signals from the pressing-force sensors 102, determines a zoom speed as a function of the finger pressing force $p_C$, and successively outputs information on the determined zoom speed to the operation controller 124.

The operation controller 124 inputs the respective sets of information from the touch-position recognizing unit 121, the pressing-force recognizing unit 122 and the zoom-speed determining unit 123. Further, based on the sets of information, the operation controller 124 commands the lens module 109, the image processing unit 113, the display controller 126, etc., to perform operations including mode selection and mode activation, activation of the focusing operation, activation of the image-capturing operation, etc., and controls each of those operations. For example, the operation controller 124 instructs the lens module 109 on the positions of elements including the zoom lens, the focus lens, etc., instructs the image processing unit 113 to perform operations including the activation of the image-capturing operation, the activation of the playback operation, etc., and instructs the display controller 126 to display images, icons, etc. for each of those operations.

Based on information received from the operation controller 124 on the commands for those operations and the activation of those operations, the haptic feedback controller 125 controls the haptic feedback arrangement 102 to impart the haptic feedback to the finger in a fashion associated with the information.

The display controller 126 inputs information on the commands for those operations and the activation of those operations from the operation controller 124, and commands the display 101 to display an image associated with those operations. Further, the display controller 126 inputs the video signal from the image processing unit 113, and commands the display 101 to display live, captured image of the subject (motion picture) in the image displaying region 104. Still further, the display controller 126 inputs the captured-image data from the storage 114, and commands the display 101 to display the image represented by the captured-image data as a play-backed image in the image displaying region 104.

Figure 6:
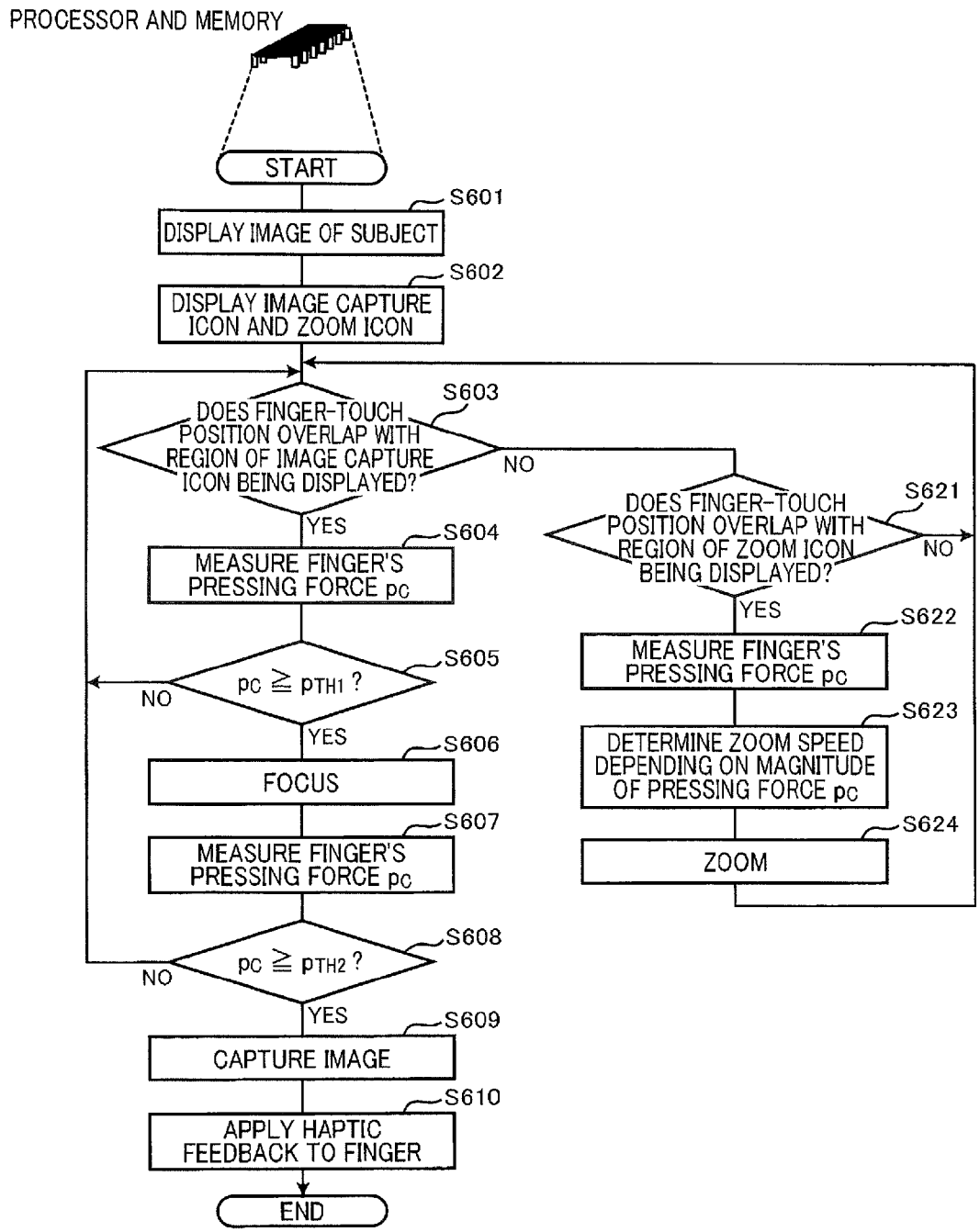
FIG. 6 is a flowchart conceptually illustrating an example of an image-capturing method implemented by causing a processor of the mobile information device depicted in FIG. 1(A) to execute an image-capture control program.

FIG. 6 is a flowchart conceptually illustrating an example of the image-capturing method implemented by causing the processor and memory to execute the image-capturing control program. With reference to this flowchart, an example of the image-capturing method implemented by the processor and memory will be described below. It is noted that the image-capturing method of FIG. 6 is adaptable to the scenario in which the user selects the (C) auto-focus image capture mode by actuating the mode selection icon 107.

As illustrated in FIG. 6, at first, the display controller 126 causes the display 101 to display an image of the subject (step S601). Next, the display controller 126 causes the display 101 to display the image capture icon 105 and the zoom icon 106 (step S602). The touch-position recognizing unit 121 follows to determine whether the finger touch position has an overlap with the region of the image capture icon 106 being displayed (step S603).

If the touch-position recognizing unit 121 makes a determination that the finger touch position has no overlap with the region of the image capture icon 106 being displayed, then the touch-position recognizing unit 121 goes on to determine whether or not the finger touch position has an overlap with the region of the zoom icon 106 being displayed (step S621).

If the touch-position recognizing unit 121 makes a determination that the finger touch position has an overlap with the region of the zoom icon 106 being displayed, then the pressing-force sensors 103 measure the finger pressing force $p_C$ (step S622). Subsequently, the zoom-speed determining unit 123 determines the zoom speed as a function of the magnitude of the measurement of the pressing force $p_C$ (step S623). Thereafter, the operation controller 124 allows the image of the subject to be zoomed at the determined zoom speed (step S624). Subsequently, the process returns to step S603.

If, however, in step S603, the touch-position recognizing unit 121 makes a determination that the finger touch position has an overlap with the region of the image capture icon 106 being displayed, then the pressing-force sensors 103 measure the finger pressing force $p_C$ (step S604). Subsequently, the pressing-force recognizing unit 122 determines whether or not the pressing force $p_C$ is equal to or larger than the first threshold $p_{TH1}$ ($p_C \geq p_{TH1}$) (step S605).

If the pressing-force recognizing unit 122 determines that $p_C \geq p_{TH1}$ is satisfied, then the operation controller 124 recognizes that the user has issued a command for the focusing-operation, and invokes the focusing operation (step S606). At this moment, the display controller 126 causes the display 101 to display a portion of the image of the subject, which is in focus. If, however, the pressing-force recognizing unit 122 determines that $p_C \geq p_{TH1}$ is not satisfied, then the process returns to step S603.

After completion of step S606, the pressing-force sensors 103 measure the finger pressing force $p_C$ (step S607). Subsequently, the pressing-force recognizing unit 122 determines whether the pressing force $p_C$ is equal to or larger than the second threshold $p_{TH2}$ ($p_C \geq p_{TH2}$) (step S608).

If the pressing-force recognizing unit 122 determines that $p_C \geq p_{TH2}$ is satisfied, then the operation controller 124 recognizes that the user has issued a command for the image-capturing operation, and invokes the image-capturing operation (step S609). At this moment, the haptic feedback arrangement 102 preferably imparts the haptic feedback to the finger (step S610). If, however, the pressing-force recognizing unit 122 determines that $p_C \geq p_{TH2}$ is not satisfied, then the process returns to step S603.

As will be evident from the foregoing description, the image capturing device, the image-capturing method and the program, each of which is constructed according to the present embodiment requires the user to perform a finger press to the image capture icon 105 rather than a pure touch to the image capture icon 105, in order to issue a command for the focusing operation and the image-capturing operation and invoke these operations. As a result, the present embodiment makes it easy for the user to command the image capturing device to perform the image-capturing operation and invoke this operation, by the user's manipulation of the image capturing device with high maneuverability, while inhibiting incorrect operation of the image capturing device, despite that the user's manipulation is a finger motion on the touch panel 100.

While some of embodiments of the present invention have been described above in detail with reference to the drawings, they are just examples, and the present invention may be embodied in alternative modes, which begin with the modes described in the section titled "Summary of the Invention," or which are obtained by making various modifications and improvements to the above-described embodiments, in view of the knowledge of those skilled in the art.

The invention claimed is:

1. An image capturing device for displaying an image of a subject on a display screen, and performing an image-capturing operation for capturing the image of the subject in response to a user's input to the display screen, the image capturing device comprising:
 a pressing-force sensor for detecting a pressing force with which the user presses the display screen with a finger;
 an operation controller configured to initiate a focusing operation to focus on the subject in response to a determination that the detected pressing force increases to a first threshold, and after the focusing operation is initiated, to initiate the image-capturing operation in response to a determination that the pressing force further increases to a second threshold greater than the first threshold;
 a haptic feedback arrangement configured to impart haptic feedback to the finger in contact with the display screen; and
 a haptic feedback controller configured to activate the haptic feedback arrangement to impart to the finger vibrations with a rapid change in intensity at a point where the pressing force increases to the first threshold and a rapid change in intensity at a point where the pressing force further increases to the second threshold, wherein the rapid change in the intensity at the first threshold and the rapid change in the intensity at the second threshold are distinct.

2. The image capturing device according to claim 1, wherein the operation controller initiates the focusing operation, in response to the user's half press of the display screen with the finger by applying a pressing force equal to or greater than the first threshold and less than the second threshold, and initiates the image-capturing operation, in response to the user's subsequent press of the display screen with the finger by applying a pressing force equal to or greater than the second threshold.

3. The image capturing device according to claim 1, further comprising:
 a display controller configured to display an image capture icon on the display screen such that at least one of a position and a size of the image capture icon displayed is adjustable.

4. The image capturing device according to claim 1, wherein the haptic feedback controller is activated in response to the user's manipulation of a virtual control displayed on the display screen with the finger, to control the haptic feedback arrangement to impart vibrations to the finger in a manner that causes the user to misperceive the finger manipulation of the virtual control as if the user manipulated a physical control with the finger.

5. The image capturing device according to claim 1, further comprising:
 a zoom-speed determining unit configured to determine a zoom speed at which a displayed image of the subject on the display screen is zoomed, prior to the image-capturing operation;
 a display controller configured to display a zoom icon on the display screen, the zoom icon being actuated by the user for commanding the image capturing device to initiate zooming operation; and
 a touch-position recognizing unit configured to determine whether or not the finger touch position has an overlap with a region of the zoom icon displayed,
 wherein the zoom-speed determining unit determines the zoom speed as a function of a magnitude of the pressing force, in response to a determination that the finger touch position has an overlap with the region of the zoom icon displayed, and
 the operation controller instructs displaying an image of the subject on the display screen such that the image is zoomed at the determined zoom speed, prior to the image-capturing operation.

6. The image capturing device according to claim 1, further comprising:
 a display controller configured to display a mode selection icon on the display screen, the mode selection icon being actuated by the user to select one from a plurality of modes including a mode for performing the image-capturing operation, and a mode for performing playing-back operation in which an image previously captured by the image capturing device is played back; and
 a touch-position recognizing unit configured to determine whether or not the finger touch position has an overlap with a region of the mode selection icon displayed, wherein the operation controller is activated in response to a determination that the finger touch position has an overlap with the region of the mode selection icon displayed and the pressing force is equal to or greater than the third threshold, to select one from the plurality of modes, depending on which one of a plurality of positions within the region of the mode selection icon displayed has an overlap with the finger touch position, and perform the selected mode.

7. A method of operating an image capturing device for displaying an image of a subject on a display screen, and performing an image-capturing operation for capturing the image of the subject in response to a user's input to the display screen, the method comprising:
 detecting a pressing force with which the user presses the display screen with a finger;
 in response to a determination that the pressing force is equal to or greater than a first threshold, initiating a focusing operation to focus on the subject;
 after the focusing operation is initiated, in response to a determination that the pressing force is equal to or greater than a second threshold greater than the first threshold, initiating the image-capturing operation; and
 imparting haptic feedback to the finger in contact with the display screen, by imparting to the finger vibrations exhibiting a rapid change in intensity at a point where the pressing force increases to the first threshold and a rapid change in intensity at a point where the pressing force further increases to the second threshold,
 wherein the rapid change in the intensity at the first threshold and the rapid change in the intensity at the second threshold are distinct.

8. A method of operating an image capturing device for displaying an image of a subject on a display screen, and performing an image-capturing operation for capturing the image of the subject in response to a user's input to the display screen, the method comprising:
 in response to the user's finger touch to the display screen with a touch intensity higher than a first threshold, initiating a focusing operation to focus on the subject;
 in response to the user's finger touch to the display screen with a touch intensity higher than a second threshold greater than the first threshold, initiating the image-capturing operation for capturing the subject displayed on the display screen; and
 imparting haptic feedback to the finger in contact with the display screen by imparting to the finger vibrations exhibiting a rapid change in intensity at a point where the touch intensity increases to the first threshold and a rapid change in intensity at a point where the touch intensity further increases to the second threshold,
 wherein the rapid change in the intensity at the first threshold and the rapid change in the intensity at the second threshold are distinct.

9. A non-transitory computer-readable storage medium containing software for causing a computer to perform the method according to claim 8.

* * * * *